(12) United States Patent
Childress

(10) Patent No.: US 11,384,535 B2
(45) Date of Patent: Jul. 12, 2022

(54) FLOOR ASSEMBLIES AND METHODS

(71) Applicant: THE BOEING COMPANY, Chicago, IL (US)

(72) Inventor: Jamie J. Childress, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 37 days.

(21) Appl. No.: 16/895,937

(22) Filed: Jun. 8, 2020

(65) Prior Publication Data

US 2021/0381232 A1   Dec. 9, 2021

(51) Int. Cl.
   *E03F 5/06*    (2006.01)
   *E04B 5/48*    (2006.01)
   *B64C 1/18*    (2006.01)

(52) U.S. Cl.
   CPC . *E04B 5/48* (2013.01); *B64C 1/18* (2013.01)

(58) Field of Classification Search
   CPC . E03F 5/06; A47L 23/266; E04F 17/00; E04F 19/10; A01K 1/0151; A47K 3/40; B64C 1/18; E04B 5/48
   See application file for complete search history.

(56) References Cited

U.S. PATENT DOCUMENTS

| | | | |
|---|---|---|---|
| 543,999 A * | 8/1895 | Morton | |
| 3,605,166 A | 9/1971 | Chen | |
| 3,995,328 A | 12/1976 | Carolan et al. | |
| 4,063,315 A | 12/1977 | Carolan et al. | |
| 4,420,180 A | 12/1983 | Dupont et al. | |
| 4,533,352 A | 8/1985 | Van Beek et al. | |
| 4,819,276 A | 4/1989 | Stevens | |
| 5,020,638 A | 6/1991 | Smith | |
| 5,150,863 A * | 9/1992 | Hozumi | B64D 11/02 244/118.5 |
| 5,176,667 A | 1/1993 | Debring | |
| 5,199,457 A | 4/1993 | Miller | |

(Continued)

FOREIGN PATENT DOCUMENTS

| | | |
|---|---|---|
| CN | 107232944 A | 10/2017 |
| EP | 1808546 A1 | 7/2007 |

(Continued)

OTHER PUBLICATIONS

Extended European Search Report dated Oct. 2, 2019 for EP Application No. 19170026.9-1010.

(Continued)

*Primary Examiner* — Brian E Glessner
*Assistant Examiner* — Daniel J Kenny
(74) *Attorney, Agent, or Firm* — The Small Patent Law Group LLC; Joseph M. Butscher

(57) ABSTRACT

A floor assembly is provided. The floor assembly is configured to form or be positioned on a floor of an enclosed space. The floor assembly includes a grid, a pan, and a surround member. The grid has an array of openings configured to allow passage of liquid. The pan is disposed beneath the grid and defines a cavity. The pan includes a pan floor and a frame. The frame is disposed laterally outward of the pan floor and supports the grid. The surround member is supported by the frame. The surround member is disposed laterally outward of the grid, and the surround member and grid do not overlap.

17 Claims, 6 Drawing Sheets

(56) References Cited

U.S. PATENT DOCUMENTS

| | | | |
|---|---|---|---|
| 5,230,188 A * | 7/1993 | Nurse | A47L 23/28 |
| | | | 210/163 |
| 5,349,965 A | 9/1994 | McCarver | |
| 5,351,931 A * | 10/1994 | Houben | D21F 13/02 |
| | | | 162/382 |
| 5,355,837 A * | 10/1994 | Reyes | A01K 1/0107 |
| | | | 119/161 |
| 5,827,246 A | 10/1998 | Bowen | |
| 6,102,073 A | 8/2000 | Williams | |
| 6,290,685 B1 | 9/2001 | Insley et al. | |
| 6,470,512 B1 | 10/2002 | Lau et al. | |
| 6,941,703 B2 * | 9/2005 | MacLean | A01K 1/0103 |
| | | | 137/312 |
| 7,051,748 B2 | 5/2006 | Vanbasten | |
| 7,131,965 B1 | 11/2006 | Thornbury et al. | |
| 7,316,834 B2 | 1/2008 | Hernandez | |
| 7,363,936 B1 | 4/2008 | Simoneaux et al. | |
| 8,163,367 B2 * | 4/2012 | Lee | A47L 23/266 |
| | | | 428/71 |
| 8,372,506 B2 | 2/2013 | Vainshtein | |
| 8,677,521 B2 * | 3/2014 | Stimpson | A61H 35/00 |
| | | | 4/613 |
| 8,839,812 B2 | 9/2014 | Tanhehco et al. | |
| 9,447,920 B2 * | 9/2016 | Wilson | B64D 27/00 |
| 9,623,133 B2 | 4/2017 | Childress et al. | |
| 9,737,045 B1 * | 8/2017 | Scanlan | A01K 1/0107 |
| 9,777,489 B2 * | 10/2017 | Gomo | E04F 17/00 |
| 9,822,539 B1 * | 11/2017 | Krombein | E03F 5/0408 |
| 10,065,740 B2 | 9/2018 | Childress et al. | |
| 10,520,241 B1 | 12/2019 | Nelson | |
| 2002/0092110 A1 | 7/2002 | Blum et al. | |
| 2003/0177572 A1 | 9/2003 | Guerin et al. | |
| 2003/0211291 A1 | 11/2003 | Castiglione et al. | |
| 2004/0019993 A1 | 2/2004 | Blum et al. | |
| 2005/0081290 A1 * | 4/2005 | Stimpson | A47K 3/40 |
| | | | 4/613 |
| 2006/0041238 A1 | 2/2006 | Bowen | |
| 2009/0241442 A1 | 10/2009 | Maclean et al. | |
| 2013/0099055 A1 | 4/2013 | Pfeiffer | |
| 2014/0115764 A1 | 5/2014 | Cheng et al. | |
| 2014/0230185 A1 | 8/2014 | Burea et al. | |
| 2015/0061380 A1 | 5/2015 | Schomacker | |
| 2015/0298440 A1 | 10/2015 | Crotty et al. | |
| 2015/0322656 A1 | 11/2015 | Huang et al. | |
| 2016/0302380 A1 * | 10/2016 | Hasegawa | A01K 1/0107 |
| 2017/0283062 A1 | 10/2017 | Childress | |
| 2018/0015862 A1 | 1/2018 | Chavez Martinez et al. | |
| 2020/0018065 A1 | 1/2020 | Childress | |

FOREIGN PATENT DOCUMENTS

| | | | |
|---|---|---|---|
| EP | 3225549 A1 | 10/2017 | |
| EP | 3225549 B1 | 2/2019 | |
| EP | 3594104 | 1/2020 | |
| WO | 2005012085 A1 | 2/2005 | |
| WO | 2014036217 A2 | 3/2014 | |
| WO | 2018077118 A1 | 5/2018 | |
| WO | WO 2019/230828 | 12/2019 | |

OTHER PUBLICATIONS

Non-Final Office Action dated Feb. 19, 2020 for U.S. Appl. No. 16/175,337 (20 pages).

Extended European Search Report dated Jul. 28, 2017 for EP Application No. 17160151.1-1754.

Curtis, U.S. Patent Application No. 456,085 titled "Door Mat" patented Jul. 14, 1891.

Morton, U.S. Patent Application No. 543,999 titled "Combined Mat and Scapper" patented Aug. 6, 1895.

Amazon, "Richell Paw Trax Mesh Training Tray" Amazon.com (3 pages).

Amazon, "Blyss Pets Klean Paws Indoor Dog Potty, No Torn Potty Pads!" Amazon.com (3 pages).

Panseal, "The Seal to use with HPL Laminated Shower Wall Panels" https://www.sealux.com/panseal/ (2 pages).

Shower Seals Direct, "Shower Seals, Bath Seals, How to choose the correct one" Shower Seal & Bath Seals, https://www.showersealsdirect.co.uk/showersandbathseals (4 pages).

Extended European Search Report for EP 21170213.9.1010, dated Oct. 19, 2021.

* cited by examiner

FLOOR ASSEMBLIES AND METHODS

FIELD OF THE DISCLOSURE

Embodiments of the present disclosure generally relate to assemblies and methods for providing a floor for collection and/or removal of liquid, such as a lavatory floor within a commercial aircraft.

BACKGROUND OF THE DISCLOSURE

In various environments, floors may be subject to spillage or leakage of liquids. It may not be possible or practical to manually remove the liquid from the floor in as short a time as may be desired. For example, commercial aircraft are used to transport passengers between various locations. During a flight—particularly a trans-oceanic or other long haul flight—passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight. Liquid (e.g., from the sink) may be spilled to the lavatory floor.

An aircraft lavatory is generally cleaned between flights. For example, maintenance or cleaning personnel board the aircraft on the ground before and/or after a flight to clean the lavatory. However, during a flight, they may not be cleaned regularly. Consequently, the dryness of lavatory floors onboard an aircraft may be compromised, particularly during flights. Further, maintenance of floor assemblies used to drain or remove liquid from the floor may be difficult or inconvenient, for example in the close quarters generally found in aircraft lavatories.

SUMMARY OF THE DISCLOSURE

Certain embodiments of the present disclosure provide a floor assembly. The floor assembly is configured to form or be positioned on a floor of an enclosed space. The floor assembly includes a grid, a pan, and a surround member. The grid has an array of openings configured to allow passage of liquid. The pan is disposed beneath the grid and defines a cavity. The pan includes a pan floor and a frame. The frame is disposed laterally outward of the pan floor and supports the grid. The surround member is supported by the frame. The surround member is disposed laterally outward of the grid, and the surround member and grid do not overlap.

Certain embodiments of the present disclosure provide a method for installing a floor assembly that is configured to form or be positioned on a floor of an enclosed space. The method includes positioning a pan. The pan defines a cavity, and includes a pan floor and a frame, with the frame disposed laterally outward of the pan floor. Further, the method includes disposing a grid above the cavity and supported by the frame of the pan. The grid has an array of openings configured to allow passage of liquid. The method further includes positioning a surround member over the frame. The surround member is supported by the frame. The surround member is disposed laterally outward of the grid, and the surround member and grid do not overlap.

Certain embodiments of the present disclosure provide a method. The method includes forming a pan for a floor assembly. The floor assembly is configured to form or be positioned on a floor of an enclosed space. The pan defines a cavity, and includes a pan floor and a frame. The frame is disposed laterally outward of the pan floor and defines an inner zone and an outer zone. The method also includes forming a ridge interposed between the outer zone and the inner zone.

DETAILED DESCRIPTION OF THE DISCLOSURE

Embodiments of the present disclosure provide for providing a dry floor, such as a lavatory floor. Embodiments may be used in various settings, such as within a lavatory of a vehicle, a public washroom in a building, a laboratory, and/or the like. Examples of vehicles for various embodiments include aircraft, ships, or ground-based vehicles, such as buses or trains.

Various embodiments provide a method and a floor assembly that can have improved ease of use, including maintenance and replacement of components. Various embodiments can effectively and efficiently provide a dry lavatory floor having improved convenience of service and maintenance onboard an aircraft, particularly during a flight.

Various embodiments of the present disclosure can provide a floor assembly (e.g., a dry floor assembly) for removing liquids from a floor or walking surface. Various embodiments may provide a grid or structure located above a removable absorbent pad is easily and conveniently removable for pad replacement and/or maintenance on a pan of the floor assembly. For example, a surrounding portion of the floor assembly in various embodiments does not overlap with the grid, allowing the surrounding portion to remain in place while the grid is removed.

In various embodiments, surrounding portions of a floor assembly are integrated with a dry floor tray or pan and a wall or other surrounding structure such that a grid of the assembly may be removed without removing the surrounding portions. Any liquid that lands on the surrounding portions is directed toward the grid (and, ultimately, an absorbent member such as a pad disposed below the grid). In various embodiments, the surrounding portion has a surface that is angled or sloped to direct liquids toward the grid. Because the grid may be removed with the surrounding portion left in place, maintenance (e.g., removal of pad or liquid from pan) is easily performed by lifting the grid.

Various embodiments may provide for the removal of liquids from a floor. Further, various embodiments may provide easily replaceable components that are seamlessly interfaced to existing infrastructure (e.g., aircraft infrastructure).

Figure 1:
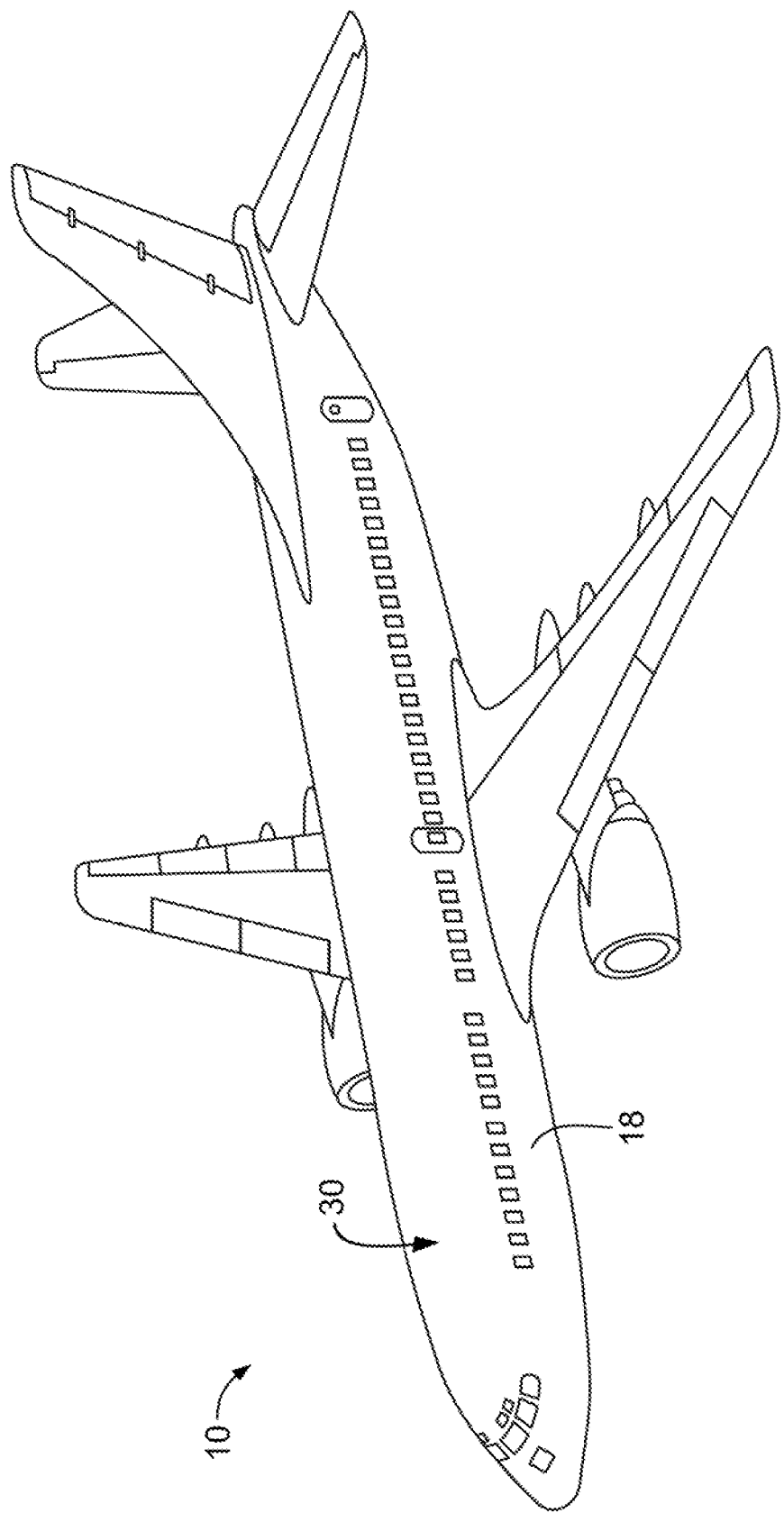
FIG. 1 illustrates a perspective top view of an aircraft, according to an embodiment of the present disclosure.

FIG. 1 illustrates a perspective top view of an aircraft 10, according to an embodiment of the present disclosure. The aircraft 10 includes a fuselage 18. While various embodiments are discussed in connection with aircraft, it may be again noted that other embodiments may be utilized in connection with, for example, other vehicle, such as ships, or ground-based vehicles such as buses or trains.

The fuselage 18 of the aircraft 10 defines an internal cabin 30, which may include a cockpit, one or more work sections (for example, galleys, personnel carry-on baggage areas, and the like), one or more passenger sections (for example, first class, business class, and coach sections), and an aft section in which an aft rest area assembly may be positioned. The internal cabin 30 includes one or more lavatories, for example, the lavatories 99 shown in FIG. 2. Various embodiments of the present are configured to automatically dry floors within the lavatories.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings. As an example, embodiments of the present disclosure may be used to automatically dry floors of lavatories, whether or not the lavatories are within vehicles.

Figure 2:
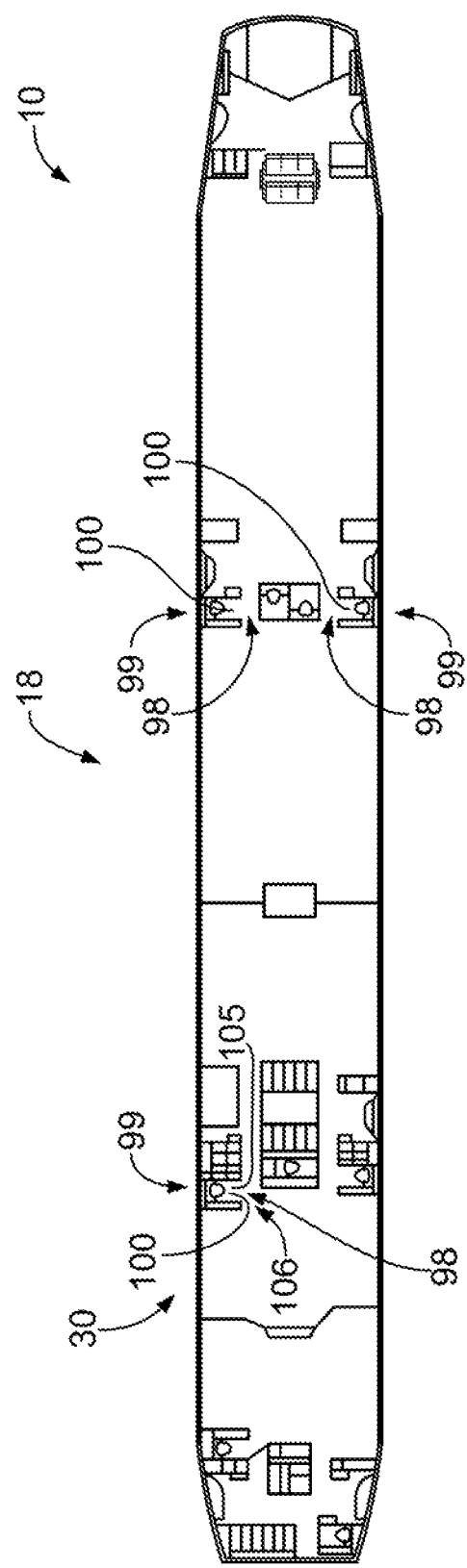
FIG. 2 illustrates a top plan view of an internal cabin of an aircraft, according to an embodiment of the present disclosure.

FIG. 2 illustrates a top plan view of an internal cabin 30 of an aircraft, according to an embodiment of the present disclosure. The internal cabin 30 may be within the fuselage 18 of the aircraft 10 shown in FIG. 1.

One or more lavatories 99 may be located within the internal cabin 30. Each lavatory 99 includes a lavatory floor 98. The lavatories 99 may include floor assemblies (e.g., floor assembly 100) as discussed herein, which may be secured within a portion of the fuselage. The floor assemblies 100 are configured to reduce or eliminate an amount of visible liquid on an exposed top surface.

Figure 3:
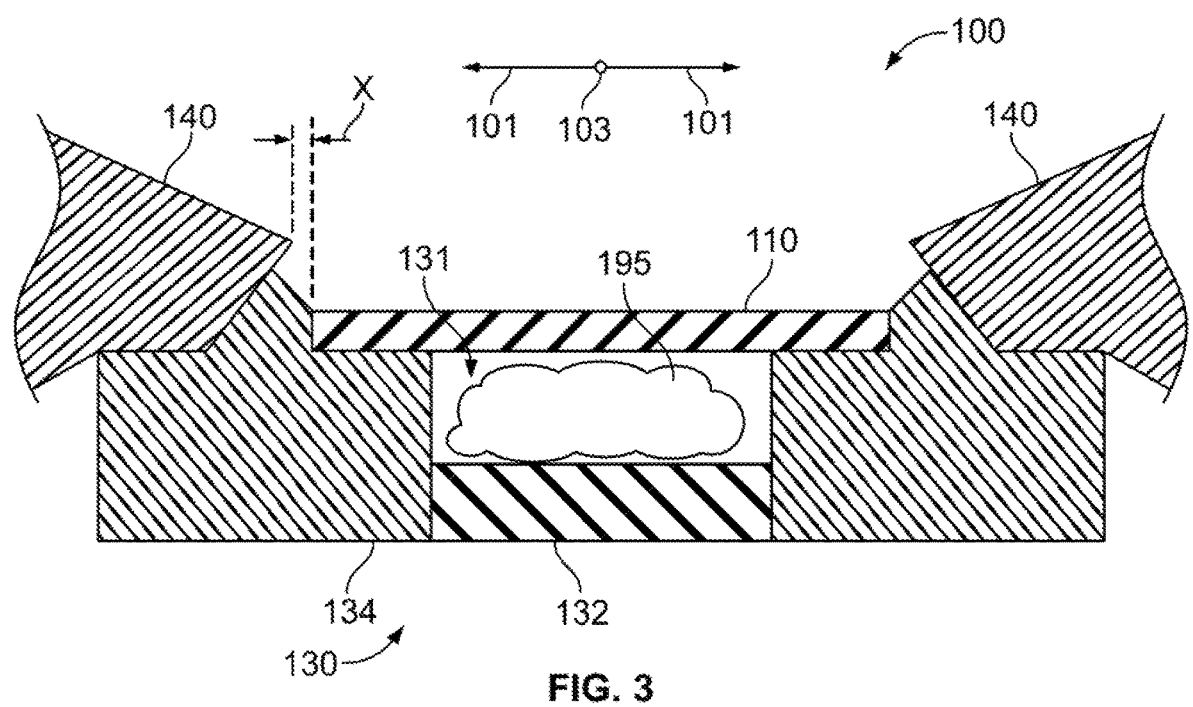
FIG. 3 illustrates a side sectional view of a floor assembly, according to an embodiment of the present disclosure.
Figure 4:
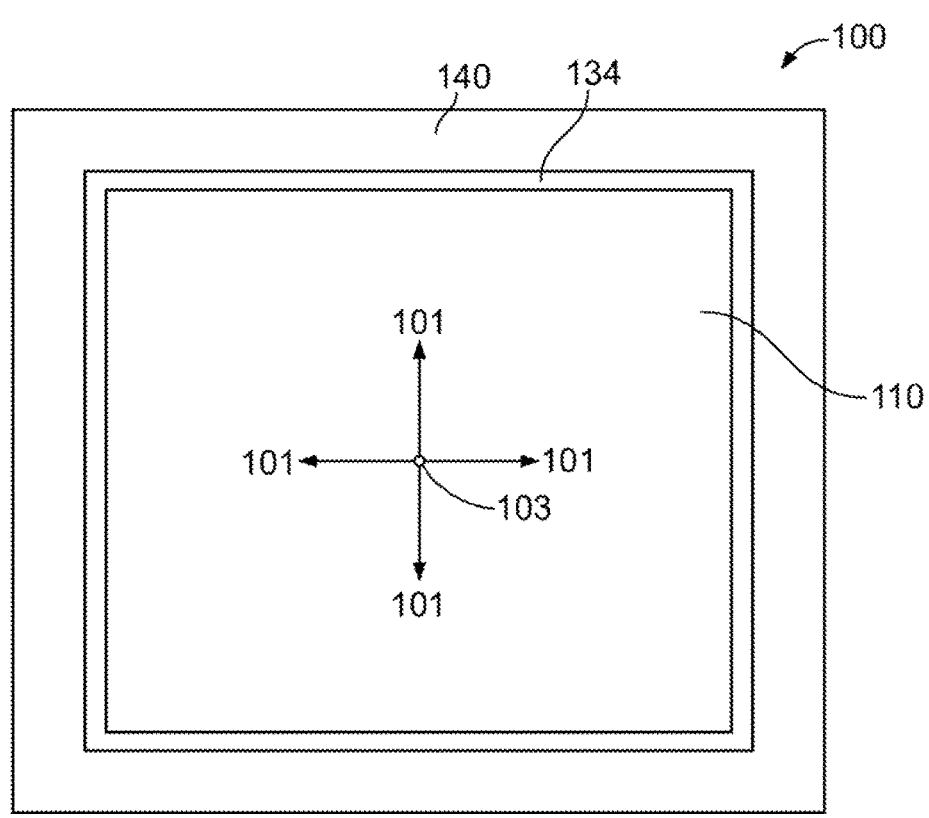
FIG. 4 provides a plan view of the floor assembly of FIG. 3.

FIG. 3 illustrates a side sectional view of a floor assembly 100, and FIG. 4 illustrates a plan view of the floor assembly 100. As seen in FIG. 3, the floor assembly 100 of the illustrated example includes a grid 110, a pan 130, and a surround member 140. The floor assembly 100 can also include an absorbent member 195 (e.g., absorbent pad). Optionally, a wicking layer and/or support layer (not shown in FIG. 1) may be included. The floor assembly 100 is configured to form a portion of a floor 105 (e.g., lavatory floor 98) in an enclosed space 106 (e.g., aircraft lavatory, ship lavatory, or lavatory of ground-based vehicles such as buses or trains), or to be positioned on or in a floor 105 of an enclosed space 106. Generally, the grid 110 provides a surface to be walked upon, and has openings through which liquid spilled on the walking surface passes.

The wicking layer is configured to direct the liquid that has passed through the grid 110 toward the pan 130. The pan 130 is used to collect, store, and/or direct the liquid for disposal. For example, in the embodiment depicted in FIG. 3, the absorbent member 195 is disposed beneath the grid 110 (e.g., within the pan 130) and used to absorb liquid passing through the grid 110. The absorbent member 195, for example, may be replaced after the absorbent member 195 has absorbed a predetermined amount of liquid and/or at a predetermined time interval.

Because the grid 110 and surround member 140 do not overlap (e.g., when viewed from above), the grid 110 is conveniently removable for access to the absorbent member 195 without removal of the surround member 140. As seen in FIG. 3, the inward most edge of the surround member 140 is located a distance X laterally outward of the outer most edge of the grid 110, such that the surround member 140 and the grid 110 do not overlap when viewed from above. In the illustrated example, the inward most edge of the surround member 140 is located a distance above the grid 110 as well as a distance laterally outward of the grid 110. In other embodiments, the surround member 140 and grid 110 may be adjacent to each other and spaced a distance apart laterally. In some embodiments, the surround member 140 and grid 110 may abut each other laterally.

While various embodiments herein are discussed in connection with use in commercial aircraft (e.g., in an aircraft lavatory), it should be noted that alternative embodiments may be used in other applications. It is noted that the examples of grids 110 and absorbent members 195 are provided by way of example and not limitation.

As best seen in FIG. 3, the pan 130 is disposed beneath the grid 110 when the floor assembly 100 is in place. The pan 130 includes a pan floor 132 and a frame 134, with the frame 134 disposed laterally outward (e.g., farther from central point 103 along direction 101) of the pan floor 132. The frame 134 supports the grid 110. The pan 130 defines a cavity 131. For example, the cavity 131 may be defined above the pan floor 132 and between at least portions of the frame 134. Generally, the cavity in various embodiments is used to collect and/or remove liquid that accumulates in the pan 130. For example, in the illustrated example, the cavity 131 is used for placing the absorbent member 195. In other examples, the cavity 131 may be used to route liquid through a drainage or plumbing system, or, as another example, the cavity 131 may define a reservoir for storing the liquid for later removal.

Figure 5:
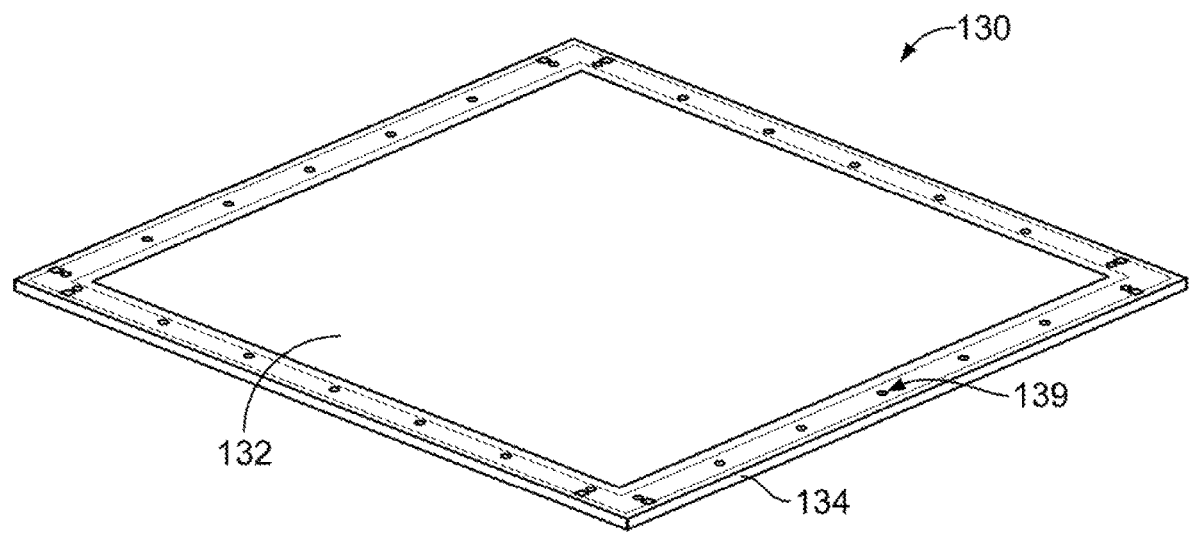
FIG. 5 provides a perspective view of a pan of the floor assembly of FIG. 3.

In some examples, the pan floor 132 and the frame 134 may be integrally formed from a single piece. In other examples, the pan floor 132 and frame 134 may be separate portions initially that are subsequently formed to form the pan 130. For example, FIG. 5 provides a perspective view of an example pan 130 of the floor assembly 100. In the example of FIG. 5, the pan floor 132 is made using a metallic material, and the frame 134 of the pan 130 is made of a plastic material. The material for the pan floor 132 in various examples is selected to provide a desired rigidity while maintaining a desired weight. Metallic materials in various embodiments can provide pan floors with light weight, high strength, and high corrosion resistance. For instance, in one example, the pan floor 132 is formed with 0.020 inch (0.5 millimeters) thick titanium, which is bonded to the frame 134. The frame 134 in various examples is molded into a desired shape.

For instance, in various examples, the frame 134 is formed using a thermoplastic or thermoset plastic, which may or may not be reinforced with fibers, as appropriate for a given application. The frame 134 may be molded as a single piece, or alternatively, may be formed from separately molded pieces that are subsequently joined. In various embodiments, the frame 134 (or at least upper surfaces of the frame 134) is coated with a hydrophobic material to encourage any liquid landing on the frame 134 to flow off of the frame 134. All or a portion of the frame 134 may be sloped toward the pan floor 132 or cavity 131 to direct the flow of liquid toward an absorbent material within the cavity 131 (e.g., absorbent member 195).

With continued reference to FIGS. 3 and 4, the surround member 140 is supported by the frame 134 when the floor assembly 100 is assembled. The surround member 140 is disposed laterally outward (e.g., farther from central point 103 along direction 101) of the grid 110. The surround member 140 and the grid 110 do not overlap each other (e.g., when viewed from above as in FIG. 4). Accordingly, the grid 110 may be removed while leaving the surround member 140 in place, improving convenience and ease of accessing the cavity 131 (e.g., to remove/replace the absorbent member 195 and/or perform other cleaning or maintenance on the pan floor 132).

In various embodiments, the surround member 140 is formed of a plastic material. Further, in various embodiments, the surround member 140 (or at least upper surfaces of the surround member 140) is coated with a hydrophobic material to encourage any liquid landing on the surround member 140 to flow off of the surround member 140. All or a portion of the surround member 140 may be sloped toward the frame 134 as well as the pan floor 132 or cavity 131 to direct the flow of liquid toward an absorbent material within the cavity 131 (e.g., absorbent member 195).

It should be noted that, while the surround member 140 is depicted as a single piece in the illustrated example, the surround member 140 may include or be formed of multiple pieces. For example, in some examples, the surround member 140 is formed from four pieces, one piece for each side of the floor assembly 100.

Generally, the surround member 140 is formed to fit or complement an environment in which the floor assembly 100 is to be positioned. Accordingly, while the illustrated example is shown as generally rectangular, it should be noted that various different shapes of surround member 140 may be employed in various embodiments to accommodate or match structures within the environment within which the floor assembly 100 is positioned. Further, while the example of FIG. 3 is shown as only supported by the frame 134, it should be noted that portions (e.g., portions that are positioned laterally outward of the frame 134) may be supported by a floor of an environment in which the floor assembly 100 is positioned, and/or abut a wall, sink, or other structure in which the floor assembly 100 is positioned.

Figure 6:
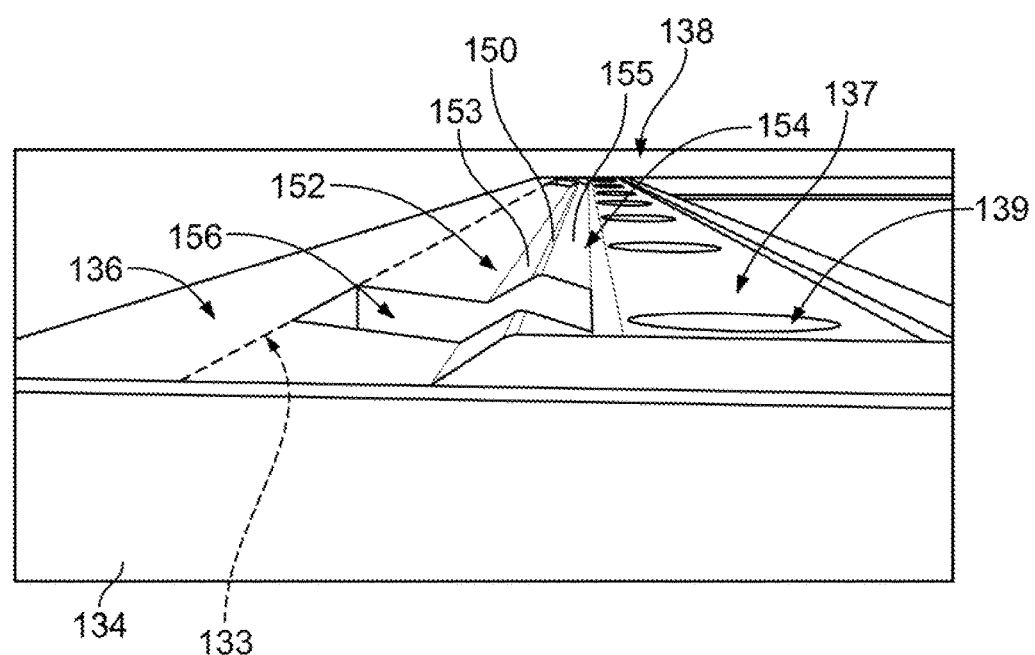
FIG. 6 provides a side perspective view of a frame of the floor assembly of FIG. 3.
Figure 7:
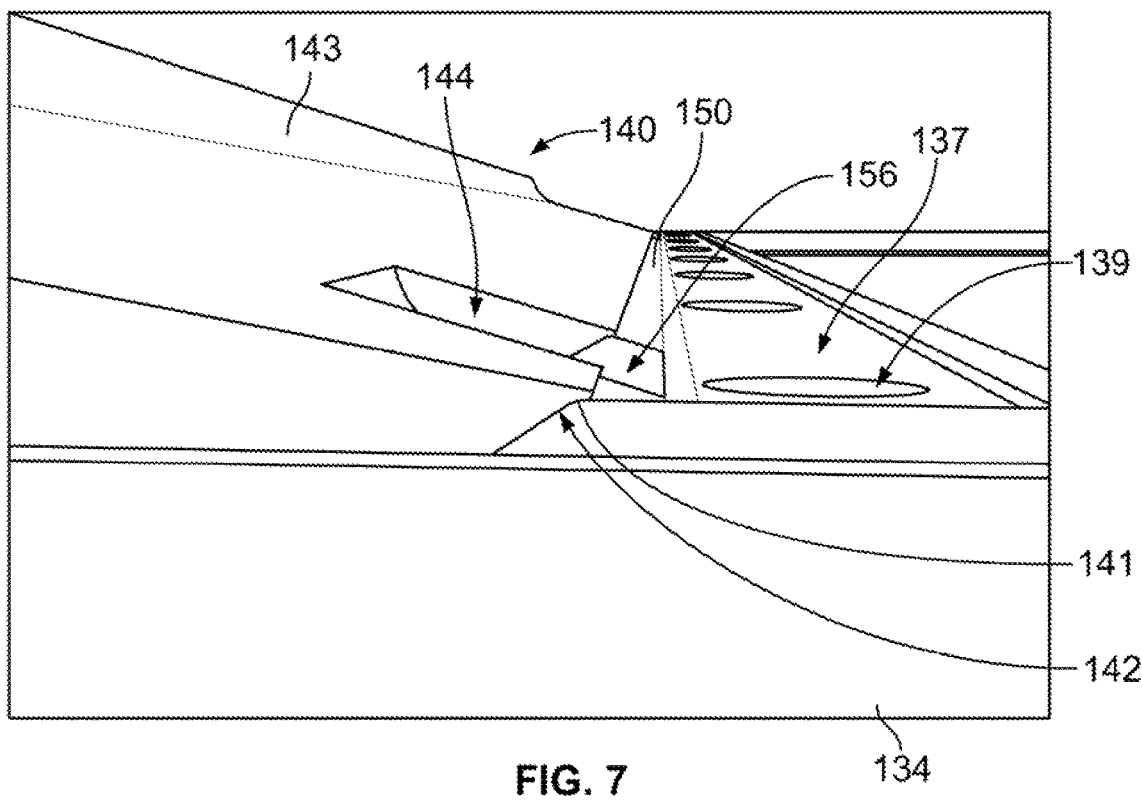
FIG. 7 provides a side perspective view of aspects of the floor assembly of FIG. 3.

As discussed above, the surround member 140 (e.g. a portion of the surround member 140) is supported by the frame 134 (e.g., a portion of the frame 134). In various embodiments, the surround member 140 and the frame 134 overlap partially, but not entirely, when viewed from above (as in FIG. 4). In the illustrated example, as best seen in FIGS. 6 and 7, the frame 134 defines an outer zone 136 and an inner zone 138. The surround member 140 is mounted to the outer zone 136, and the grid 110 is supported by the inner zone 138.

The outer zone 136 and inner zone 138 may be contiguous, or may alternatively be separated by one or more intermediate portions. In various embodiments, the surround member 140 may contact one or more portions laterally inward of the outer zone 136 but be bonded (e.g., using a tape or other adhesive) to the outer zone 136.

As best seen in FIG. 6, the example frame 134 includes a ridge 150 that is interposed between the outer zone 136 and the inner zone 138. As seen in FIG. 6, the ridge 150 defines an outer slope 152 (on an outer surface 153) and an inner slope 154 (on an inner surface 155). The outer slope 152 is located laterally outward of the inner slope 154. The outer slope 152 slopes laterally outward and downward, and the inner slope 154 slopes laterally inward and downward. Generally, the outer slope 152 is configured to support or otherwise cooperate with the surround member 140 to position and/or support the surround member, and the inner slope 154 is configured to direct liquid toward the cavity 131 (e.g., absorbent member 195) disposed within the cavity 131.

As discussed above, portions of the frame and/or surround member can be sloped toward cavity 131 or pan floor 132. The slope may be generally continuous in various embodiments. For example, as best seen in FIG. 7, the depicted surround member 140 includes a lower surface slope 142 (defined by a lower surface 141) that is complementary to the outer slope 152 of the ridge 150 of the frame 134. For example, in the illustrated embodiments, the lower surface slope 142 and the outer slope 152 are complementary in that the sum of angle defined by the lower surface slope 142 with respect horizontal and the angle defined by the outer slope 152 with respect to horizontal is about 180 degrees, allowing for a seamless connection between the slopes while securely, accurately, and reliably positioning the surround member 140 with respect to the frame 134.

As seen in FIG. 7, the surround member 140 extends slightly farther laterally inward than the peak or apex of the ridge 150, which can insure that liquid flowing off of the surround member 140 is directed to the inner slope 154 of the ridge 150 and eventually toward the cavity 131. In the illustrated embodiment, a slope defined by an upper surface 143 of the surround member 140 and the inner slope 154 of the ridge 150 is generally continuous, providing about 15 degrees of slope with respect to horizontal. The frame 134 (and/or other aspects of the floor assembly 100) in various embodiments includes features configured to improve ease of installing and/or maintaining the floor assembly 100.

Figure 8:
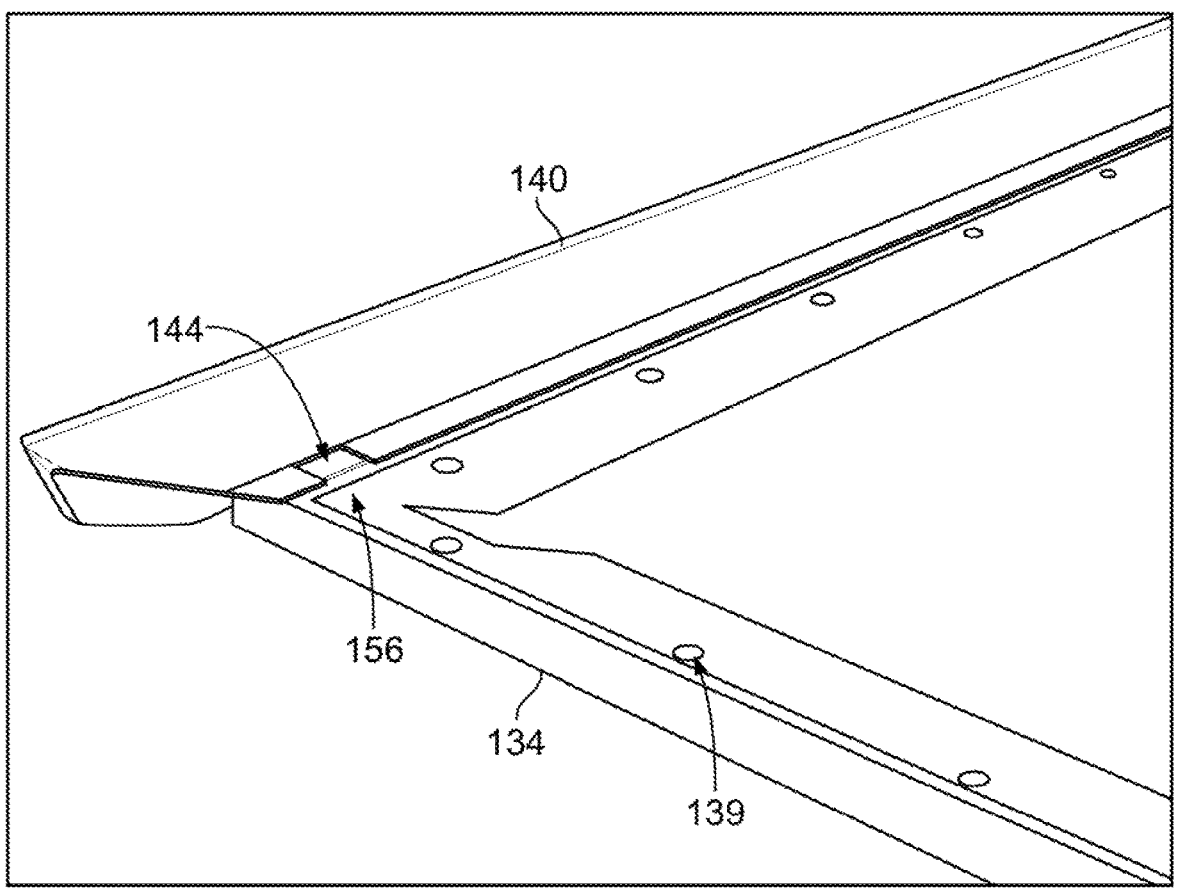
FIG. 8 provides a side perspective view of aspects of the floor assembly of FIG. 3.

For example, in the illustrated embodiment, as best seen in FIGS. 6-8, the depicted frame 134 includes a trench 137. The trench 137 is located laterally inward of the ridge 150 (e.g., within the inner zone 138), and includes openings 139 that pass through the frame 134. In the illustrated example, the trench 137 extends along generally straight lines laterally outward of the cavity 131 on each side of the frame 134, with the openings 139 aligned along lines generally parallel to those of the trench 137. The openings 139 are used for securing the grid 110 to the frame 134. For example, magnets may be disposed in the openings 139 to removably secure the grid 110 (e.g., a metallic strip of the grid 110) to the frame 134.

As best seen in FIGS. 6-8, the depicted example frame 134 includes a notch 156 that passes through the ridge 150. The notch 156 is sized and configured to allow placement of a finger in the notch 156 to facilitate convenient removal of the grid 110 using the finger. In the illustrated example, the notch 156 extends laterally outward past the ridge 150 and terminates at a border 133 of the outer zone 136. Extension of the notch 156 laterally outward past the ridge is configured to provide a large enough notch for placement of a fingertip. Additionally in the depicted example, as best seen in FIGS. 7 and 8, the surround member 140 has a complementary notch 144 aligned with the notch 156 of the frame 134, further improving ease of placing a finger for removal of the grid 110.

Figure 9:
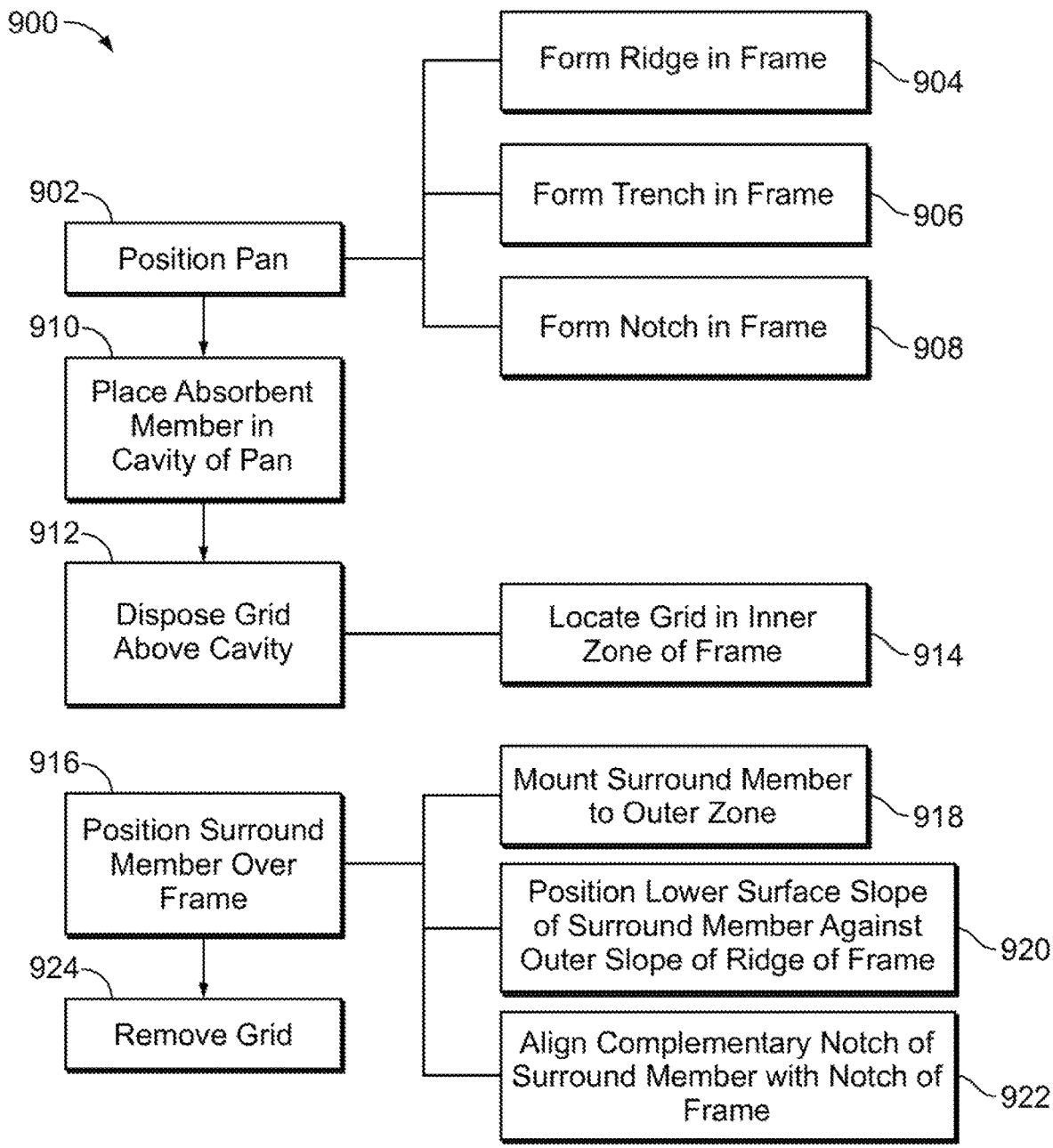
FIG. 9 illustrates a flow chart of a method for providing a floor assembly, according to an embodiment of the present disclosure.

FIG. 9 illustrates a flowchart of a method 900 (e.g., for installing a floor assembly (e.g., assembly 100) that is configured to form or be positioned on a floor of an enclosed space (e.g., aircraft lavatory)). It may be noted that one or more aspects of the depicted method 900 may be utilized, either independently of installing the assembly or in conjunction with installation or assembly steps, in forming or manufacturing one or more portions of the floor assembly. The method 900, for example, may employ structures or aspects of various embodiments discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 902, a pan (e.g., pan 130) is positioned (e.g., within a pre-formed depression or other predetermined location proximate a floor surface). For example, positioning the pan in various embodiments includes positioning the pan in or on a portion of a floor (e.g., portion of a floor 105) in an enclosed space (e.g., enclosed space 106). For example, the pan may be sized to fit an existing opening or depression of the floor, with the pan positioned inside the existing opening or depression. The pan defines a cavity (e.g., cavity 131). The cavity in various embodiments is used to collect and/or remove liquid that accumulates in the pan (e.g., by housing an absorbent pad that absorbs the liquid, routing liquid through a plumbing system, or storing the liquid in a reservoir defined by the cavity for later removal). The pan includes a frame (e.g., frame 134) and a pan floor (e.g., pan floor 132). The frame is disposed laterally outward of the pan floor. The pan, for example, may be placed in or on a floor, such as a floor of a lavatory of an aircraft.

Various techniques may be used in forming the pan. For example, the pan may be formed by joining a metallic pan floor with a plastic frame. In the illustrated example, at 904, forming the frame of the pan includes forming a ridge (e.g., ridge 150) on the frame, with the ridge interposed between an outer zone 136 and an inner zone 138. In various embodiments, the ridge defines an outer slope 152 that slopes laterally outward and downward, and an inner slope 154 that slopes laterally inward and downward. Other features may be formed as part of the frame.

For example, in the illustrated example, at 906, a trench (e.g., trench 137) is formed in the frame. The trench is located laterally inward of the ridge, and includes openings (e.g., openings 139) that pass through the frame. The openings, for example, may be used (e.g., in connection with magnets) to secure or position the floor assembly in place for use.

As another example, at 908 of the illustrated embodiment, a notch (e.g., notch 156) is formed in the frame. For example, the notch in various embodiments passes through the ridge of the frame. The notch may be used during removal of a grid from the floor assembly.

In the illustrated embodiment, at 910, an absorbent member (e.g., absorbent member 195) is placed in the cavity of the pan. The absorbent member is used to collect liquid that is directed toward the pan. In other embodiments, for example, liquid may accumulate in the pan for later removal (e.g., via vacuum), or may be directed from the pan via drainage or plumbing lines.

At 912, a grid (e.g., grid 110 is provided) is disposed above the cavity and supported by the frame of the pan. The grid, for example, may include a metallic strip used to secure the grid to the frame via magnets. The grid has an array of openings configured to allow passage of liquid from an upper surface of the grid into the cavity (e.g., into an absorbent member disposed in the cavity). Generally, the grid is configured to provide a support surface for walking or standing, and also to provide openings for the drainage or removal of liquid from the walking surface. In various embodiments, the grid includes members extending from a base to an upper surface configured to be walked upon. In the illustrated example, the frame includes an outer zone and an inner zone. Accordingly, positioning the grid in the illustrated example, includes, at 914, locating the grid in the inner zone.

At 916, a surround member (e.g., surround member 140) is positioned over the frame. The size and shape of the surround member may be tailored for the particular environment in which the floor assembly is to be used. The surround member is supported by the frame, and is disposed laterally outward of the grid. As discussed herein, the surround member and the grid do not overlap (e.g., when viewed from above), providing for easy removal of the grid and access to the cavity for maintenance and/or service of the cavity and any associated components such as an absorbent member.

In the illustrated example, the frame includes an outer zone and an inner zone. Accordingly, positioning the surround member in the illustrated example, includes, at 918, mounting the surround member to the outer zone. Further, in the illustrated example, positioning the surround member includes, at 920, positioning a lower surface slope of the surround member against the outer slope of the ridge of the frame. Further still, in the illustrated example, the surround member includes a complementary notch (e.g., complementary notch 144), and positioning the surround member includes, at 922, aligning the complementary notch of the surround member with the notch of the frame.

As discussed herein, various embodiments improve the ease of use of the floor assembly by providing for easy removal of the grid while leaving the surround member in place. For example, in the illustrated embodiment, after a period of use when it becomes desirable to access the cavity, at 924, the grid is removed (e.g., via a finger placed in the notch of the frame) while the surround member remains in place. With the grid removed, for example, an absorbent member may be removed and replaced. Once the desired service or maintenance activity has been performed on the cavity or associated component, the grid may be replaced in its position above the frame.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or assemblies and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The preceding summary and detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

What is claimed is:

1. A floor assembly that is configured to form or be positioned on a floor of an enclosed space, the floor assembly comprising:
   a grid having an array of openings configured to allow passage of liquid;
   a pan disposed beneath the grid, the pan defining a cavity, the pan comprising a pan floor and a frame, wherein the frame defines an outer zone and an inner zone, wherein the frame comprises a ridge interposed between the outer zone and the inner zone, wherein the ridge defines an outer slope that slopes laterally outward and downward, and an inner slope that slopes laterally inward and downward, the frame disposed laterally outward of the pan floor and supporting the grid; and
   a surround member supported by the frame, wherein the surround member is mounted to the outer zone and the grid is supported in the inner zone, wherein the surround member is disposed laterally outward of the grid, and wherein the surround member and grid do not overlap.

2. The floor assembly of claim 1, wherein the surround member comprises a lower surface slope that is complementary to the outer slope.

3. The floor assembly of claim 1, wherein the frame further comprises a trench located laterally inward of the ridge, the trench comprising openings therethrough.

4. The floor assembly of claim 1, wherein the frame further comprises a notch passing through the ridge.

5. The floor assembly of claim 4, wherein the notch extends laterally outward past the ridge and terminates at a border of the outer zone.

6. The floor assembly of claim 5, wherein the surround member has a complementary notch aligned with the notch.

7. The floor assembly of claim 1, wherein the pan floor is comprised of a metallic material and the frame of the pan is comprised of a plastic material.

8. The floor assembly of claim 1, wherein the surround member is separate and distinct from the frame, wherein the surround member is mounted on the frame.

9. A floor assembly that is configured to form or be positioned on a floor of an enclosed space, the floor assembly comprising:
   a grid having an array of openings configured to allow passage of liquid;
   a pan disposed beneath the grid, the pan defining a cavity, the pan comprising a pan floor and a frame, wherein the frame defines an outer zone and an inner zone, wherein the frame comprises a ridge interposed between the outer zone and the inner zone, and a trench located laterally inward of the ridge, the trench comprising openings therethrough, the frame disposed laterally outward of the pan floor and supporting the grid; and
   a surround member supported by the frame, wherein the surround member is mounted to the outer zone and the grid is supported in the inner zone, wherein the surround member is disposed laterally outward of the grid, and wherein the surround member and grid do not overlap.

10. The floor assembly of claim 9, wherein the surround member is separate and distinct from the frame, wherein the surround member is mounted on the frame.

11. The floor assembly of claim 9, wherein the surround member comprises a lower surface slope that is complementary to an outer slope.

12. The floor assembly of claim 9, wherein the frame comprises a notch passing through the ridge.

13. The floor assembly of claim 9, wherein the pan floor is comprised of a metallic material and the frame of the pan is comprised of a plastic material.

14. A floor assembly that is configured to form or be positioned on a floor of an enclosed space, the floor assembly comprising:
   a grid having an array of openings configured to allow passage of liquid;
   a pan disposed beneath the grid, the pan defining a cavity, the pan comprising a pan floor and a frame, wherein the frame defines an outer zone and an inner zone, wherein the frame comprises a ridge interposed between the outer zone and the inner zone, and a notch passing through the ridge, the frame disposed laterally outward of the pan floor and supporting the grid; and
   a surround member surrounded by the frame, wherein the surround member is mounted to the outer zone and the grid is supported in the inner zone, wherein the surround member is disposed laterally outward of the grid, and wherein the surround member and grid do not overlap. wherein the frame comprises.

15. The floor assembly of claim 14, wherein the notch extends laterally outward past a border of the outer zone, and wherein the surround member has a complementary notch aligned with the notch.

16. The floor assembly of claim 14, wherein the surround member is separate and distinct from the frame, wherein the surround member is mounted on the frame.

17. The floor assembly of claim 14, wherein the pan floor is comprised of a metallic material and the frame of the pan is comprised of a plastic material.

\* \* \* \* \*

UNITED STATES PATENT AND TRADEMARK OFFICE
CERTIFICATE OF CORRECTION

| | |
|---|---|
| PATENT NO. | : 11,384,535 B2 |
| APPLICATION NO. | : 16/895937 |
| DATED | : July 12, 2022 |
| INVENTOR(S) | : Jamie J. Childress |

It is certified that error appears in the above-identified patent and that said Letters Patent is hereby corrected as shown below:

In the Claims

In Claim 14 at Column 10, Line 65, delete "wherein the frame comprises.".

Signed and Sealed this
Twenty-first Day of March, 2023

Katherine Kelly Vidal
*Director of the United States Patent and Trademark Office*